United States Patent Office 3,131,569
Patented May 5, 1964

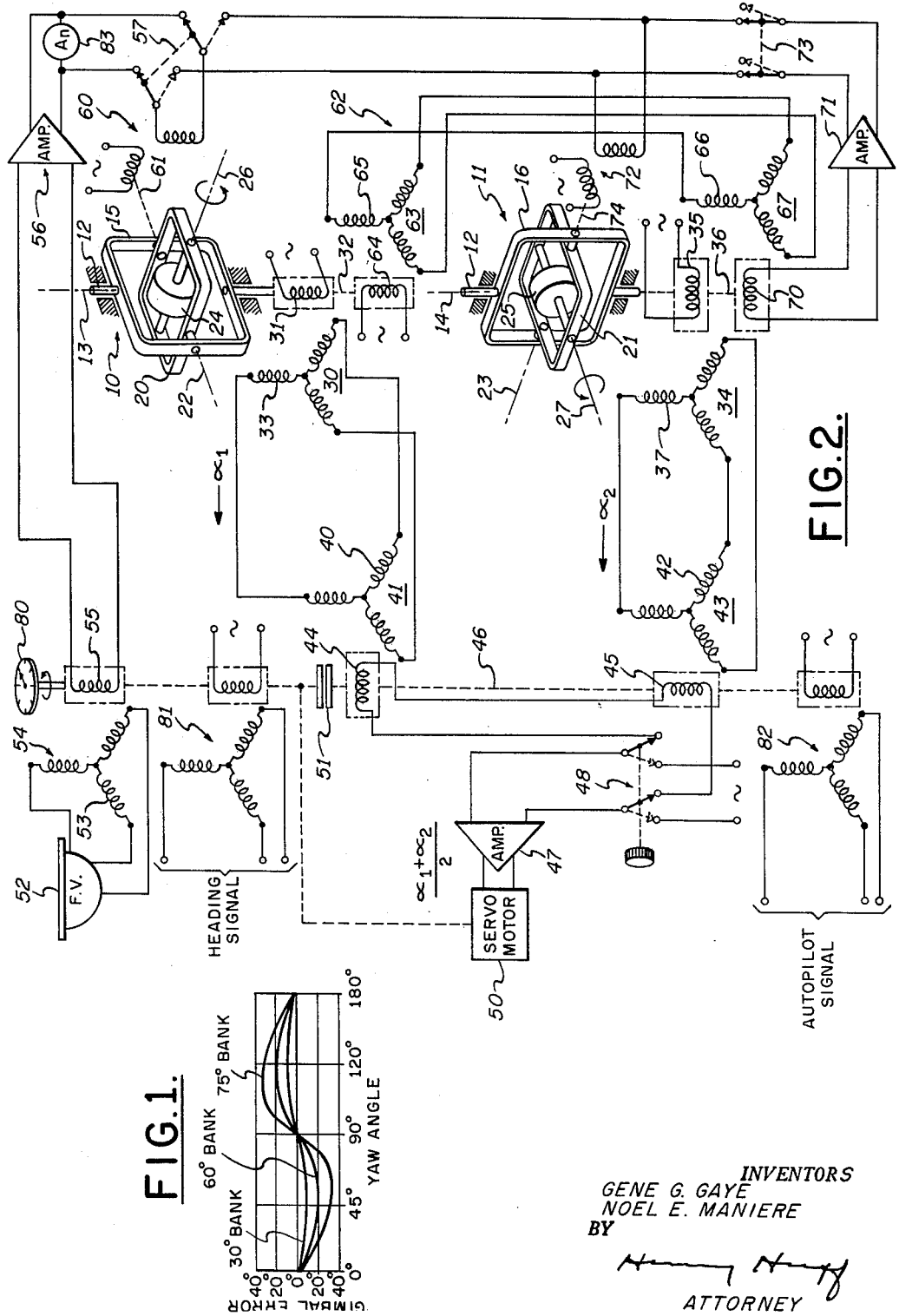

3,131,569
GYROSCOPIC APPARATUS
Gene G. Gaye, Northport, and Noel E. Maniere, Bronx, N.Y., assignors to Sperry Rand Corporation, Great Neck, N.Y., a corporation of Delaware
Filed Jan. 30, 1961, Ser. No. 85,519
4 Claims. (Cl. 74—5.34)

This invention relates to gyroscopic apparatus and particularly to improving the accuracy of the reference signals from gyroscopic apparatus by substantially eliminating errors due primarily to the gimbal structure which occur when the vehicle on which the gyroscopic apparatus is mounted is in a condition other than level.

One of the inherent errors of a two degree of freedom gyroscope is commonly known as gimbal error. This error is introduced due to the geometric arrangement of the two gimbals that support the gyroscope rotor when the vehicle such as an aircraft upon which the gyroscope is mounted deviates from a level attitude. Gimbal error is common in certain configurations of both vertical and directional two degree of freedom gyroscopes but it is most apparent and undesirable in a directional gyroscope used to provide a heading reference signal such as in gyromagnetic compass systems. The present invention will therefore be described with respect to systems of this type, it being realized however that the invention is equally applicable to two degree of freedom gyroscopes having configurations wherein a gimbal error results.

With respect to a directional gyroscope, the gimbal error for various angles of roll and pitch is given by the following equation:

$$\epsilon = \tan^{-1}\left[-\frac{\frac{\cos\Omega \sin\theta \sin\phi - \sin\Omega \cos\phi}{\cos\Omega \cos\theta} + \tan\Omega}{1 - \tan\Omega\left(\frac{\cos\Omega \sin\theta \sin\phi - \sin\Omega \cos\phi}{\cos\Omega \cos\theta}\right)}\right] \text{ degrees} \quad (1)$$

Where
$\Omega$ = true azimuth angle in degrees
$\theta$ = angle of pitch in degrees
$\phi$ = angle of roll in degrees An approximation of this formula for small angles is as follows:

$$\epsilon = 8.7 \times 10^{-3}\theta\phi - 4.4 \times 10^{-3}(\theta^2 + \phi^2)\cos 2(\Omega - E_g) \text{ degrees} \quad (2)$$

Where
$$E_g = \frac{1}{2}\tan^{-1}\frac{\phi^2 - \theta^2}{\phi\theta}$$

From the above, it will be observed that the total error consists of two parts. An index error which occurs when the aircraft is other than level in both pitch and roll and a two cycle error which occurs during any tilt of the craft. The most frequently observed case of gimbal error is that which occurs during turn, climb or dive of an airplane. Referring to Equation 2 given above, it will be seen that if one of the angles, i.e., either pitch or roll is zero, the gimbal error resulting from the other angle will be two cycle and approximately sinusoidal as shown in FIG. 1 which is a graph of the gimbal error as a function of bank angle and yaw angle with zero pitch angle.

It is therefore a primary object of the present invention to provide gyroscopic apparatus which is substantially free of gimbal error.

It is a further object of the present invention to provide gyroscopic apparatus in which the gimbal error of one gyroscope is substantially counteracted by the gimbal error of a second gyroscope thereby providing an average output signal substantially free of error.

These objects are achieved by the present invention, for example when utilizing directional gyroscopes, by so mounting the gyroscopes that the horizontal spin axis of one gyroscope is normally oriented substantially perpendicular with respect to the horizontal spin axis of the other gyroscope. Pick-off means responsive to the movements of the spin axes in the horizontal plane provide signals representative thereof. The signals from each of the gyroscopes includes a gimbal error but with the spin axis positioned 90° with respect to each other, that portion of the signal due to the gimbal error from one of the gyroscopes is substantially equal in amplitude and opposite in sense with respect to that portion of the signal from the other gyroscope. The signals are connected to algebraic summation means which provides a composite output signal representative of the average of the two input signals. Then when the craft upon which the gyroscopes are mounted is tilted, the aforementioned averaged output signal remains substantially free of gimbal error. The gyroscopes may be slaved to each other to maintain their spin axes substantially perpendicular with respect to each other, or, depending upon the drift rate of the gyroscopes, they may have their spin axes initially oriented 90° apart and thereafter operate without slaving.

The present invention by substantially eliminating the gimbal error does away with the necessity of supplying correction charts to pilots which indicate the deviation from the actual heading resulting from gimbal error depending upon the bank angle and the air speed of the aircraft. Further, the averaged output signal provided by the present invention generally has a lower drift rate than the drift rate of either gyroscope in the system.

Referring now to the drawings:
FIG. 1 is a graph showing the gimbal error versus yaw angle for bank angles of an aircraft of 30°, 60° and 75°; and
FIG. 2 is a schematic wiring diagram showing a preferred embodiment of the present invention.

Referring now to FIG. 2 the present invention will be applied to a gyromagnetic compass system utilizing two directional gyroscopes 10 and 11 mounted in an aircraft 12, it being realized however that this is for purposes of example only since the invention is equally applicable to any two corresponding gyroscopes.

The two substantially identical directional gyroscopes 10 and 11 are mounted within the aircraft 12 by trunnion-bearing connections to pivot around spaced vertical axes 13 and 14 by means of their outer vertical gimbals 15 and 16 respectively. Inner horizontal gimbals 20 and 21 are pivoted in the trunnion-bearing connections on gimbals 15 and 16 for pivoting around axes 22 and 23 respectively. The gyroscopes 10 and 11 include rotors 24 and 25 which are mounted in trunnion-bearing connections for spinning about horizontal axes 26 and 27 respectively. The gyroscopes 10 and 11 also have individual means for maintaining the spin axes 26 and 27 respectively horizontal which for purposes of simplicity are not shown. The spin axes 26 of the gyroscope 10 is normally oriented substantially perpendicular with respect to the spin axis 27 of the gyroscope 11 with both spin axes disposed in the same horizontal plane.

Each of the gyroscopes 10 and 11 includes means responsive to the movements in the horizontal plane of their respective spin axes 26 and 27 for providing a signal representative thereof. With respect to the gyroscope 10, this means includes a synchro transmitter 30 having its rotor 31 connected to an extension of the lower trunnion 32 of the vertical gimbal 15 for rotation therewith. The rotor 31 is energized from the suitable alternating current source. The stator 33 of the synchro transmitter 30 is fixed with respect to the aircraft 12. Similarly, the gyroscope 11 includes a synchro transmitter 34 having its rotor 35 connected to an extension of the lower trunnion 36 of the vertical gimbal 16 while the stator 37 is mounted on the aircraft 12. The rotor 35 is energized by the same alternating current source. The axis of symmetry of the rotor 35 is horizontally disposed 90° with respect to that of the rotor 31. The output of the synchro transmitter 30 may then, for example, provide a first output signal representative of the heading of the aircraft $\alpha_1$ while the synchro transmitter 34 may provide a second output signal representative of the heading of the aircraft $\alpha_2$.

The Y-connected windings of the stator 33 of the synchro 30 are connected to the respective Y-connected windings of the stator 40 of a synchro control transmitter 41. Similarly, the stator 37 of the synchro 34 is connected to the stator 42 of a synchro control transformer 43. The rotors 44 and 45 of the control transformers 41 and 43 respectively are mounted for rotation with a heading shaft 46. With the spin axes 26 and 27 perpendicular with respect to each other, their heading output signals $\alpha_1$ and $\alpha_2$ will also be 90° apart. By aligning the rotor 44 of the control transformer 41 90° with respect to the rotor 45 of the control transformer 43, the need for realigning the rotors 31 and 35 of the transmitters 30 and 34 respectively is eliminated.

The rotor 44 is connected electrically in series with the rotor 45 and both rotors are connected to the input terminal of a servo amplifier 47 when a manual slew switch 48 is closed as shown. The servo amplifier 47 also serves as an algebraic summation device which algebraically sums the signal from the rotors 44 and 45 and divides them by two to obtain the average thereof. The servo amplifier 47 is connected in controlling relation to a servomotor 50 which in turn is mechanically connected to rotate the heading shaft 46. The shaft 46 has attached thereto an electromagnetic clutch 51 disposed between the mechanical connection to the servomotor 50 and the rotors 44 and 45 for reasons to be explained.

To provide a gyromagnetic compass system, a flux valve 52 provides a signal representative of the magnetic meridian which is transmitted to the stator 53 of a heading synchro transmitter 54, the rotor 55 of which is mounted for rotation with the heading shaft 46. The rotor 55 is connected to a slaving amplifier 56, which with a mode switch 57 in the condition shown, provides a signal to the control field of a torque motor 60. The armature of the torque motor 60 is connected to an extension of a trunnion 61 of the horizontal gimbal 20. The torque motor 60 applies a torque around the axis 22 for precessing the gyroscope 10 around its vertical axis 13 thereby positioning the spin axis 26.

To maintain the spin axes 26 and 27 perpendicular with respect to each other, the directional gyro 11 is slaved to the directional gyro 10 by means of another synchro data transmission and slaving system 62. Gyros are usually manufactured with two transmitters aligned to each other. The use of one of the transmitters in one of the gyros as a control transformer eliminates the need for rezeroing the internal synchros since the control transformer nulls 90° away from the transmitter null. The system 62 includes a synchro transmitter 63 having its rotor 64 connected to the trunnion 32 while its stator 65 is connected to the stator 66 of a synchro transmitter 67 being used as a synchro control transformer. The rotor 64 is energized by the common alternating current source. The control transformer 67 has its rotor 70 mounted on the trunnion 36. The rotor 70 is electrically connected to an orthogonality amplifier 71 which in turn is connected to the control windings of a torque motor 72 through an orthogonality switch 73 when the switch 73 is closed as shown. The armature of the torque motor 72 is mounted on an extension of a trunnion 74 of the horizontal gimbal 21. The torque motor 72 precesses the gyroscope 11 around its vertical axis 14 thereby positioning the spin axis 27. With the mode switch 57 in the position indicated in dotted lines, the orthogonality amplifier 71 is also connected to the torque motor 60 when the orthogonality switch 73 is closed as shown.

In a manner to be explained, the position of the heading shaft 46 is representative of the heading of the aircraft 12 and therefore may be provided with a suitably calibrated heading dial 80 for providing a visual indication of the aircraft heading. To provide electrical signals representative of the aircraft heading to a compass repeater and to an automatic pilot for flight control, suitable synchro data transmission systems 81 and 82 respectively may also be disposed to be responsive to and to provide electrical signals representative of the position of the heading shaft 46.

In operation, to manually change the indicated heading on the dial 80 without slaving the directional gyros 10 and 11, the manual slew switch 48 is placed in the open position as shown in dotted lines thus connecting the servomotor 50 to a suitable power source while simultaneously disengaging the clutch 51. When the indicating heading is as desired, the manual slew switch 48 is then closed as shown in solid lines thereby connecting the signals from the rotors 44 and 45 to the servo amplifier 47.

When it is desired to operate the system as a gyromagnetic compass system, the manual slew switch 48 is closed as shown in solid lines thereby energizing and engaging the magnetic clutch 51, the mode switch 57 is in its upper position as shown in solid lines and the orthogonality switch 73 is closed as shown in solid lines. Under these conditions the flux valve 52 provides a signal representative of the magnetic heading which is transmitted through the synchro 54 to the slaving amplifier 56. Depending upon the amplitude and phase of the signal from the amplifier 56, the torque motor 60 precesses the directional gyroscope 10 through an angle and in a direction to bring the synchro 54 into alignment with the signal from the flux valve 52. Since the flux valve synchro rotor 55 is affixed to the dial 80, the dial will read magnetic heading when the rotor 55 is at null. A heading signal $\alpha_1$ is provided from the synchro transmitter 30 representative of the position of the spin axis 26 which is transmitted to the control transformer 41. The synchro transmitter 63 also provides a signal representative of the position of the spin axes 26 to the control transformer 67 where it is compared with the position of the spin axis 27 and the difference therebetween is amplified in the orthogonality amplifier 71. Depending upon the amplitude and phase of this amplified signal, it energizes the torque motor 72 to precess the directional gyro 11 to return the spin axis 27 to a position which is perpendicular with respect to the spin axis 26.

The synchro transmitter 34 provides a second heading signal $\alpha_2$ representative of this slaved position of the spin axis 27 to the control transformer 43. In the control transformers 41 and 43, the heading signals $\alpha_1$ and $\alpha_2$ are compared with the position of the heading shaft 46. In the event the heading shaft 46 is not aligned with the magnetic meridian sensed by the flux valve 52, the signal from the rotors 44 and 45 is averaged and amplified in the amplifier 47 which then energizes the servomotor 50 to rotate the shaft 46 in a direction to align the rotors 44, 45, 55, 81 and 82 correctly at which time the system will be at a null. Fast manual positioning of the dial 80 can be performed by using the manual slewing switch 48 until the annunciator 83 is nulled thereby indicating the rotor 55 is nulled to the magnetic heading.

When the aircraft 12 is in a level attitude the heading signals $\alpha_1$ and $\alpha_2$ from the synchro transmitters 30 and 34 will be equal, for example $\alpha_1 = \alpha_2 = 50°$ actual aircraft heading. However, when the aircraft 12 is tilted for example when the aircraft dives at a 40° angle, because of the gimbal error explained above, $\alpha_1$ will be representative of 40° while $\alpha_2$ will be representative of 60°. In the absence of the present invention the pilot would then be required to consult compensation charts supplied by the compass manufacturer to provide the correction which the pilot would use for mentally computing the correct heading.

However, with the present invention the heading signals $\alpha_1$ and $\alpha_2$ are averaged in the amplifier 47 to provide a true average output heading signal, i.e., $$\frac{40+60}{2} = 50°$$

actual aircraft heading. This true heading signal of 50° then appears as the correct indication on the dial 80 and signals representative thereof are applied by synchro data transmission systems 81 and 82 to the compass repeater and to the autopilot instead of the erroneous signal as explained above.

The preferred embodiment shown in FIG. 2 may also be operated in two other modes of operation (1) an orthogonality mode and (2) a free gyro mode. In the orthogonality mode, manual slew switch 48 is to the right as shown in dotted lines, mode switch 57 is in its lower position as shown in dotted lines and the orthogonality switch 73 is to the left as shown in solid lines. In this mode of operation, the signal from the flux valve 52 is ineffective since the circuit between the slaving amplifier 56 and the torque motor 60 is open.

In this mode, the spin axes 26 and 27 are maintained perpendicular by means of the synchro data transmission and slaving system 62 in the following manner. A signal representative of the position of the spin axis 26 is sensed by the synchro transmitter 63 and transmitted to the control transformer 67. The rotor 70 of the control transformer 67 is responsive to the position of the spin axis 27 and a signal representative of the difference between the desired positions of the spin axes 26 and 27 is amplified in the orthogonality amplifier 71 and transmitted to the torque motors 60 and 72. The torque motors 60 and 72 are connected in parallel in order that they precess in opposite directions thereby returning the spin axes 26 and 27 to the desired perpendicular condition. Thus, the synchro transmitters 30 and 34 continue to provide heading signals $\alpha_1$ and $\alpha_2$ respectively although the gyros 10 and 11 are not slaved to the signal from the flux valve 52.

In the free gyro mode, the manual slew switch 48 is to the right as shown in solid lines, the mode switch 57 is in its lower position as shown in dotted lines and the orthogonal switch 73 is to the right as shown in dotted lines. In this mode, the gyros 10 and 11 operate as free gyros and can provide accurate information depending upon the drift rate of the gyros and the length of time which they are operated in this mode. Although they are not slaved to maintain their spin axes 26 and 27 perpendicular with respect to each other, they will maintain this condition for a substantial length of time for example, during a turn or for missile applications. Thus, the synchro transmitters 30 and 34 will provide heading signals $\alpha_1$ and $\alpha_2$ respectively which by means of the averaging explained above will be a true heading signal with the gimbal error substantially eliminated therefrom.

Although the present invention has been disclosed in a system utilizing a single flux valve 52 it will be appreciated that the present invention may also be readily applied to two separate gyromagnetic compass systems having individual flux valves. With this arrangement, the directional gyros would be slaved to their respective flux valves and would have their spin axes maintained perpendicular with respect to each other by means of a synchro data transmission and slaving system such as 62. The heading signals $\alpha_1$ and $\alpha_2$ from the respective gyromagnetic compass systems would then be averaged in a manner similar to that disclosed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscopic device comprising a pair of gyroscopes, each gyroscope being mounted for universal movement by means of a gimbal structure, each gyroscope having at least one reference axis normally oriented substantially perpendicular with respect to the corresponding reference axis of the other gyroscope, each gyroscope including means responsive to the movements of its reference axis for providing a signal representative thereof, said gimbal structure introducing an error in said signals when said gyros are subjected to tilt, said reference axes being oriented perpendicular with respect to each other whereby said errors are substantially equal in amplitude and opposite in sense with respect to each other, and means responsive to said signals for providing a signal representative of the average thereof whereby a reference measure is provided which is the average of the positions of said reference axes and substantially free of error.

2. A gyroscopic device comprising a pair of gyroscopes, each gyroscope being mounted for universal movement by means of a gimbal structure, said gyroscopes having horizontal spin axes normally oriented substantially perpendicular with respect to each other, each gyroscope including means responsive to the movements of its spin axis for providing a signal representative thereof, said gimbal structure introducing an error in said signal when said gyros are subjected to tilt, said spin axes being oriented perpendicular with respect to each other whereby said errors are substantially equal in amplitude and opposite in sense with respect to each other, and algebraic summation means responsive to said signals for providing a signal representative of the average thereof whereby a reference measure is provided which is the average of the positions of said reference axes and substantially free of error.

3. A gyroscopic device comprising a pair of directional gyroscopes having horizontal spin axes normally oriented substantially perpendicular with respect to each other, each gyroscope being mounted for universal movement by means of a gimbal structure, signal generating means responsive to the horizontal movements of each of said spin axes for providing signals representative thereof, said gimbal structure introducing an error in said signals when said gyros are subjected to tilt, said spin axes being oriented perpendicular with respect to each other whereby said errors are substantially equal in amplitude and opposite in sense with respect to each other, and algebraic summation means responsive to said signals for providing a signal representative of the average thereof whereby a reference measure is provided which is the average of the positions of said reference axes and substantially free of error.

4. In a gyroscopic device for navigable craft, a first directional gyroscope having a first horizontal spin axis, a second directional gyroscope having a second horizontal spin axis, said first and second directional gyroscopes being adapted to have their spin axes normally mounted substantially perpendicular with respect to each other, each of said gyroscopes being mounted for universal movement by means of a gimbal structure, first and second signal generating means responsive to the horizontal movements of said first and second spin axes respectively for providing signals representative thereof, said gimbal structure introducing an error in said signals when said craft tilts, said spin axes being oriented perpendicular with respect to each other whereby said errors are substantially equal in amplitude and opposite in sense with respect to each other, and algebraic summation means responsive to said first and second signals for providing a signal representative of the average thereof whereby a reference measure is provided which is the average of the positions of said reference axes and substantially free of error.

References Cited in the file of this patent

UNITED STATES PATENTS

| | | |
|---|---|---|
| 2,559,094 | Schuck | July 3, 1951 |
| 2,591,697 | Hays | Apr. 8, 1952 |
| 2,949,785 | Singleton et al. | Apr. 23, 1960 |
| 2,977,806 | Lane | Apr. 4, 1961 |

FOREIGN PATENTS

| | | |
|---|---|---|
| 589,216 | France | Feb. 18, 1925 |